(12) United States Patent
Lee et al.

(10) Patent No.: US 12,483,161 B2
(45) Date of Patent: Nov. 25, 2025

(54) ULTRASONIC LINEAR MOTOR AND OPERATION METHOD THEREFOR

(71) Applicant: LG INNOTEK CO., LTD., Seoul (KR)

(72) Inventors: Sang Young Lee, Seoul (KR); Myoung Seok Sung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 572 days.

(21) Appl. No.: 17/912,173

(22) PCT Filed: Jan. 29, 2021

(86) PCT No.: PCT/KR2021/001180
§ 371 (c)(1),
(2) Date: Sep. 16, 2022

(87) PCT Pub. No.: WO2021/256653
PCT Pub. Date: Dec. 23, 2021

(65) Prior Publication Data
US 2023/0128248 A1  Apr. 27, 2023

(30) Foreign Application Priority Data
Jun. 16, 2020 (KR) .......................... 10-2020-0073105

(51) Int. Cl.
H02N 2/06 (2006.01)
G02B 7/02 (2021.01)
H02N 2/02 (2006.01)

(52) U.S. Cl.
CPC ............. H02N 2/067 (2013.01); G02B 7/021 (2013.01); H02N 2/026 (2013.01)

(58) Field of Classification Search
CPC ........ H02N 2/067; H02N 2/026; H02N 2/062; H02N 2/04; H02N 2/02; H02N 2/06;
(Continued)

(56) References Cited

U.S. PATENT DOCUMENTS

| 9,479,088 B2 | 10/2016 | Wischnewskiy et al. |
| 2009/0127974 A1 | 5/2009 | Piotr et al. |

(Continued)

FOREIGN PATENT DOCUMENTS

| KR | 10-0223687 | 10/1999 |
| KR | 10-0376229 | 7/2002 |

(Continued)

OTHER PUBLICATIONS

Examiner provided machine translation of Lee et al., KR 100768888 B1 (Year: 2007).*

(Continued)

*Primary Examiner* — Balram T Parbadia
(74) *Attorney, Agent, or Firm* — KED & ASSOCIATES, LLP

(57) ABSTRACT

Disclosed are an ultrasonic linear motor and a method of driving the same. The ultrasonic linear motor includes a vibrator including an elastic portion and a first piezoelectric element and a second piezoelectric element which are disposed on two surfaces of the elastic portion, a moving shaft coupled to the vibrator and moved according to a displacement of the vibrator, a mover inserted into and coupled to the moving shaft, and a controller which applies a first driving pulse and a second driving pulse to the first piezoelectric element and the second piezoelectric element, wherein a frequency of the first driving pulse and a frequency of the second driving pulse are set to a frequency between a resonant frequency at which an impedance is minimum and an anti-resonant frequency at which the impedance is maximum.

11 Claims, 11 Drawing Sheets

(58) Field of Classification Search
CPC . G02B 7/021; G02B 7/08; G02B 7/02; G03B 3/00; H10N 30/00
See application file for complete search history.

(56) References Cited

U.S. PATENT DOCUMENTS

2015/0125140 A1* 5/2015 Ashizawa .............. H02N 2/163
                                                           396/125
2017/0082828 A1* 3/2017 Sumioka ................. G03B 5/00

FOREIGN PATENT DOCUMENTS

| KR | 10-0768888 | 10/2007 |
| KR | 10-0818482 | 4/2008 |
| KR | 10-2009-0122105 | 11/2009 |

OTHER PUBLICATIONS

International Search Report dated May 4, 2021 issued in Application No. PCT/KR2021/001180.

* cited by examiner

[FIG. 1]
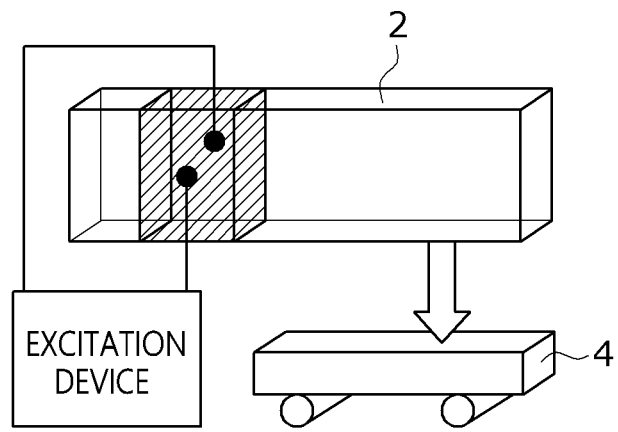
[FIG. 2]
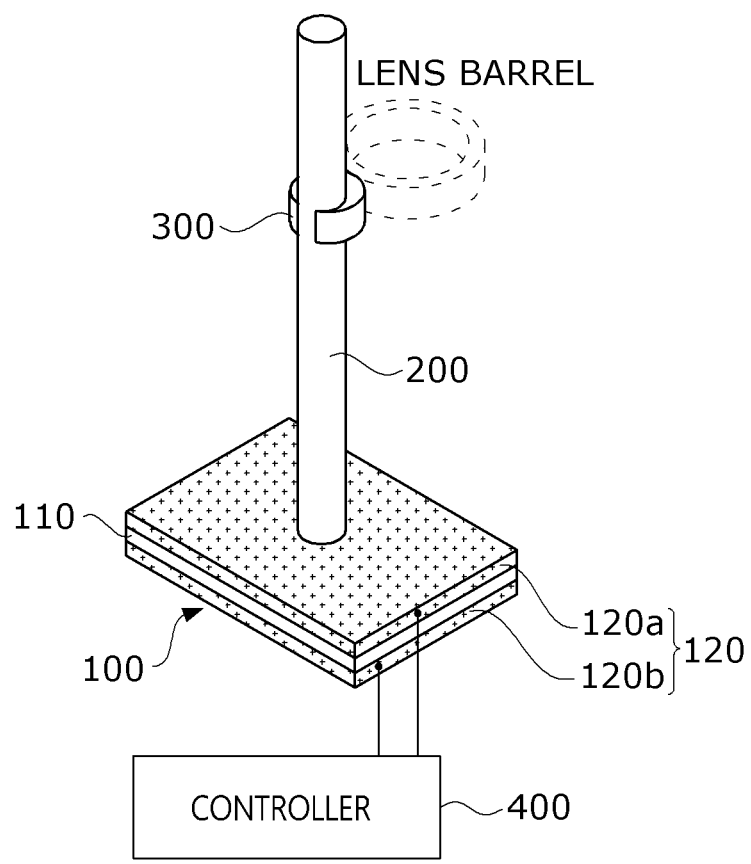

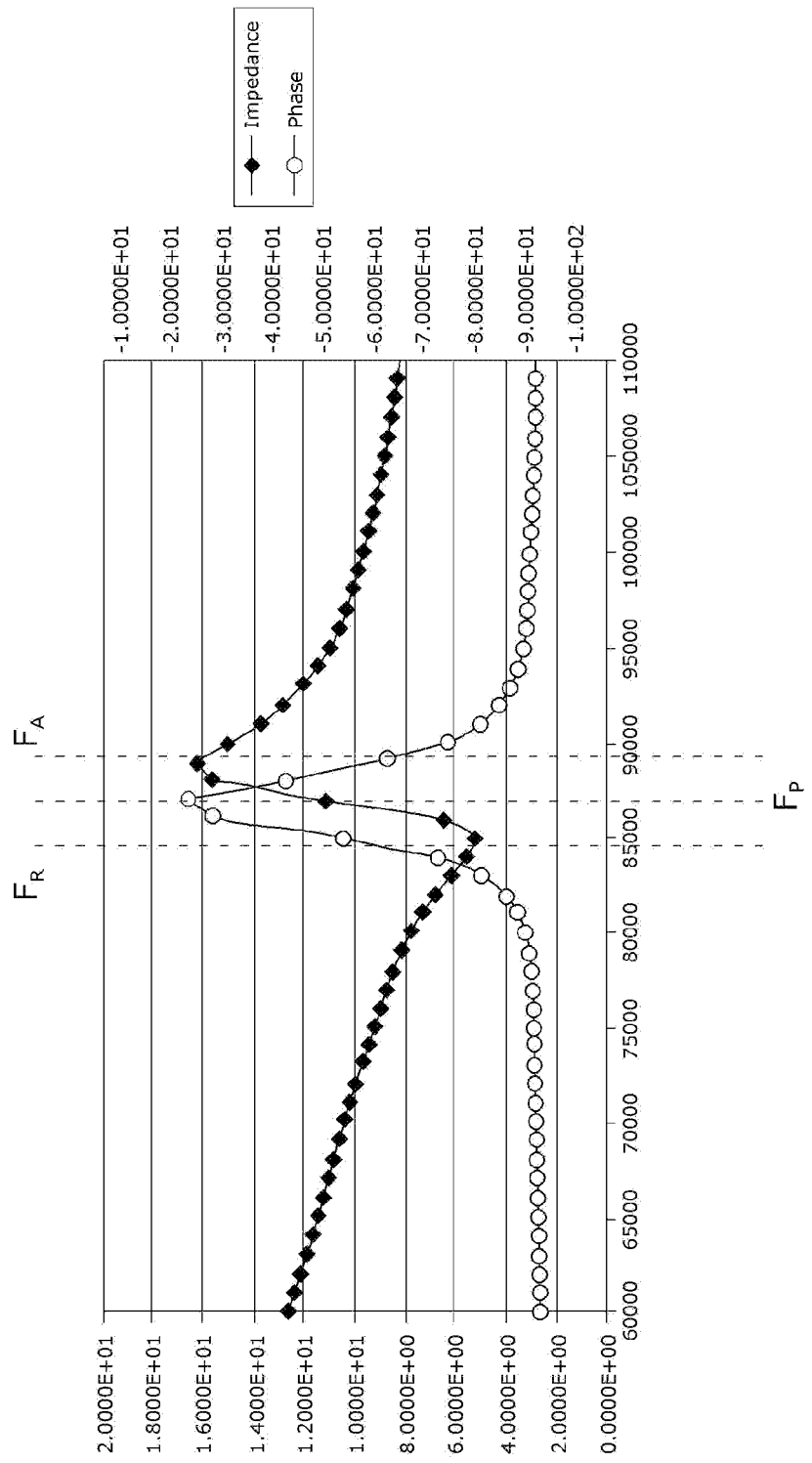

[FIG. 3B]
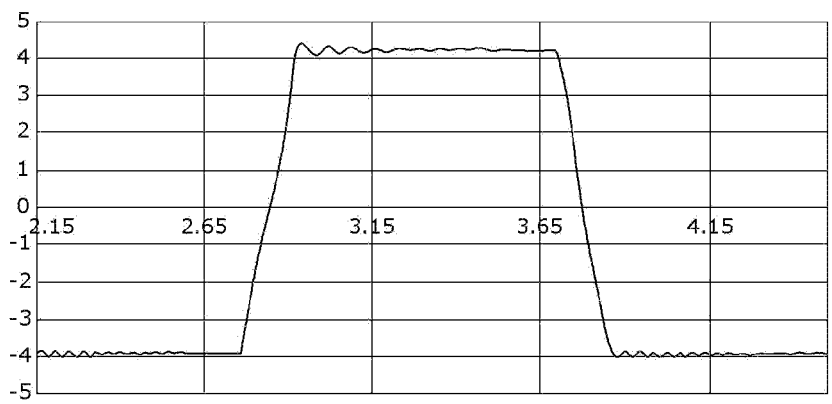
[FIG. 3C]
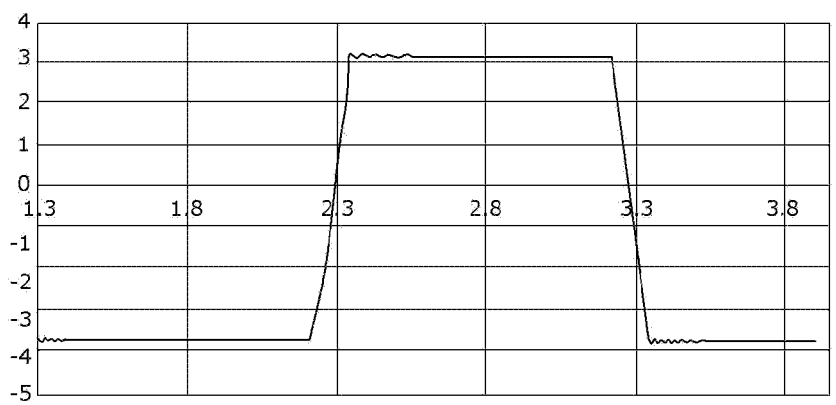

[FIG. 4A]
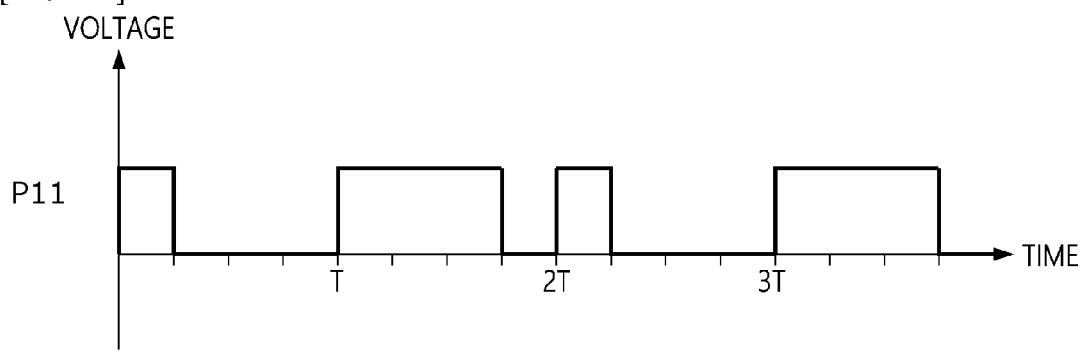
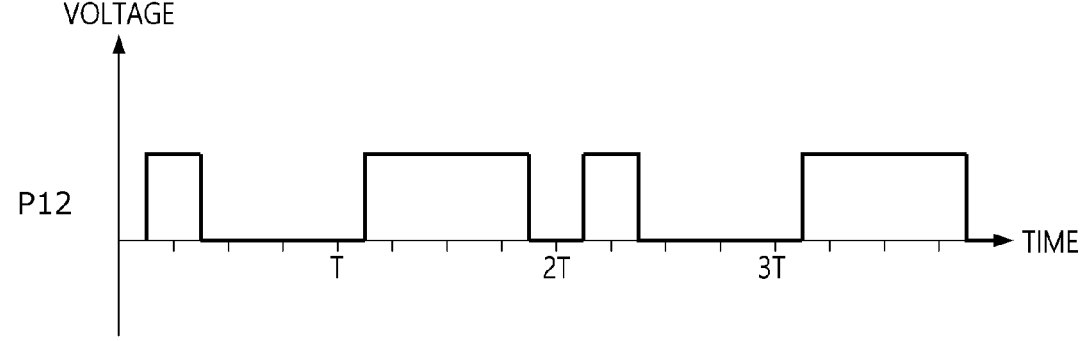

[FIG. 4B]
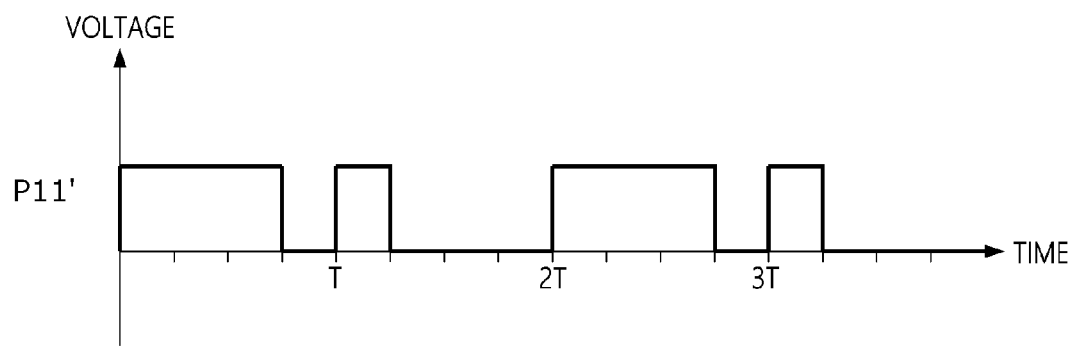
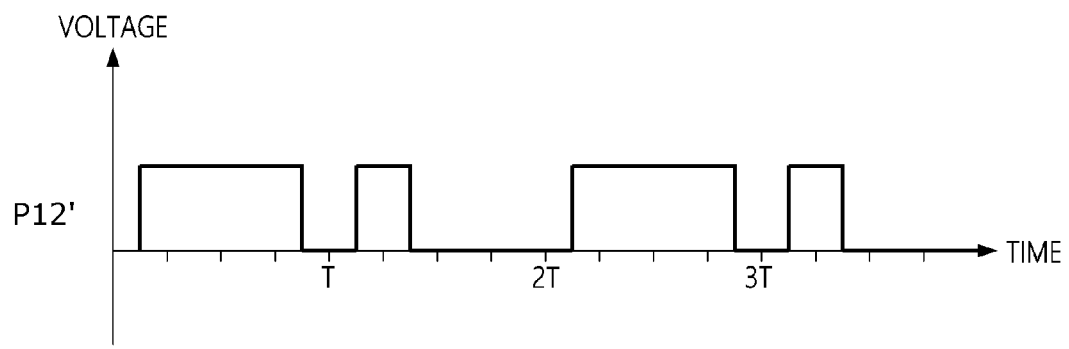

[FIG. 5]
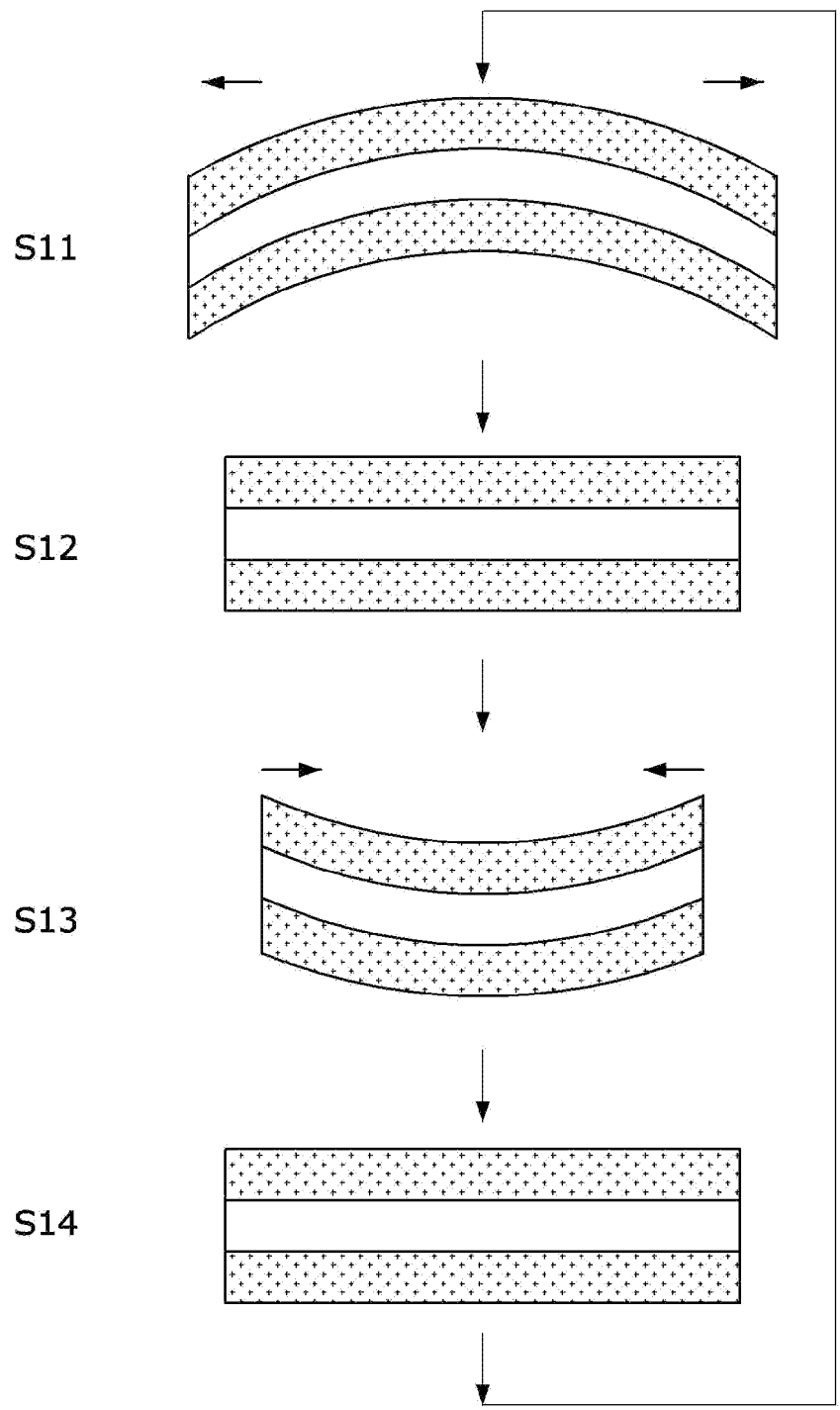

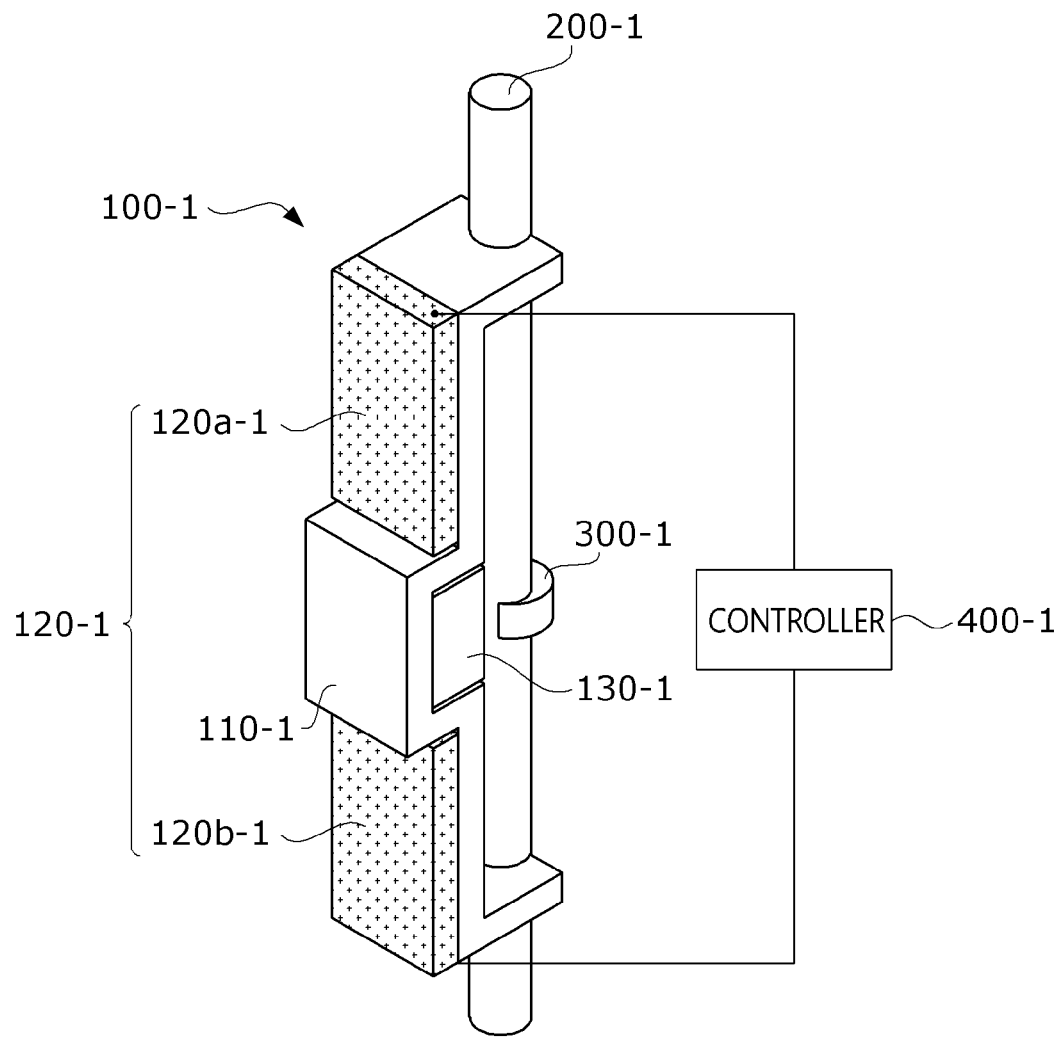
[FIG. 6]

[FIG. 7A]
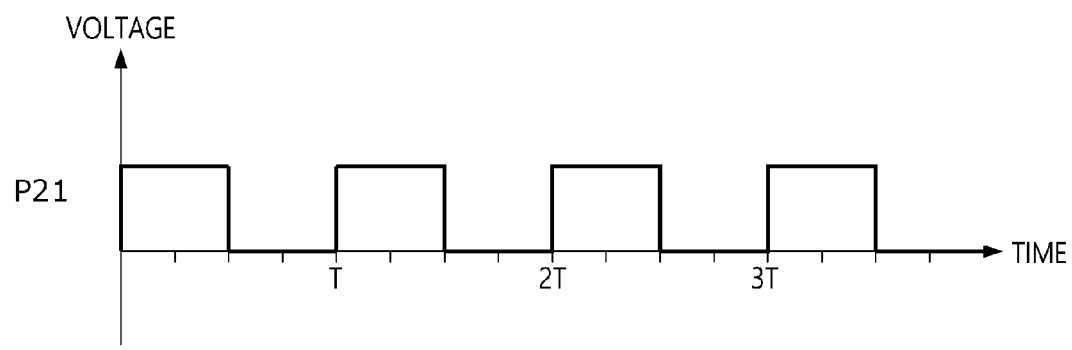
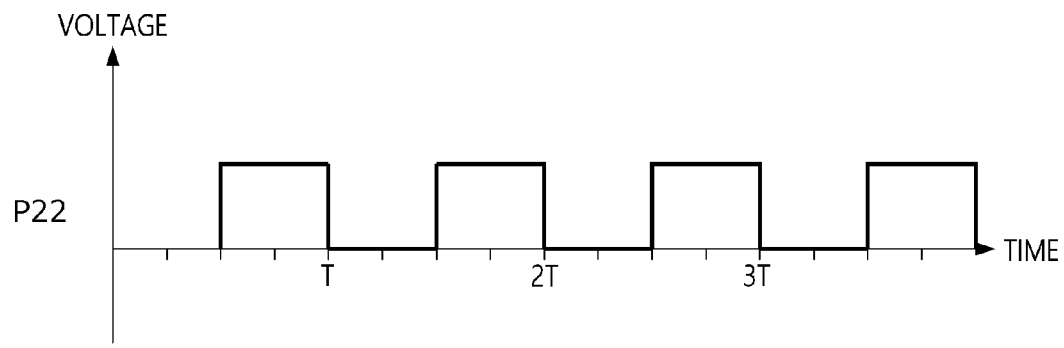

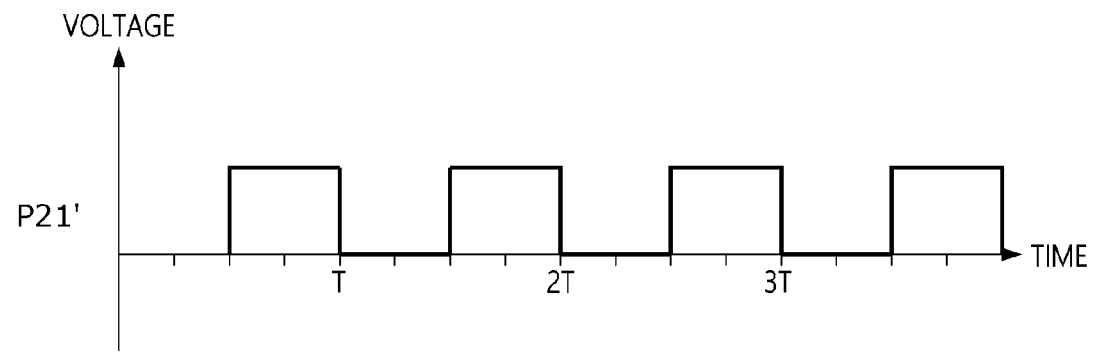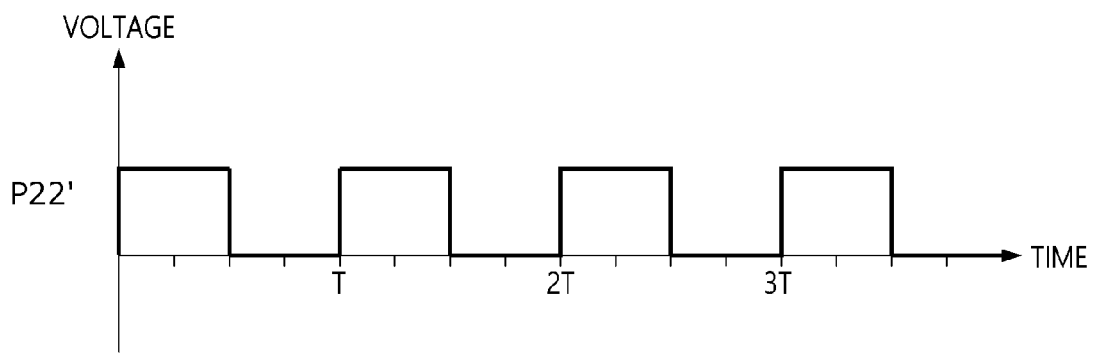

[FIG. 8]
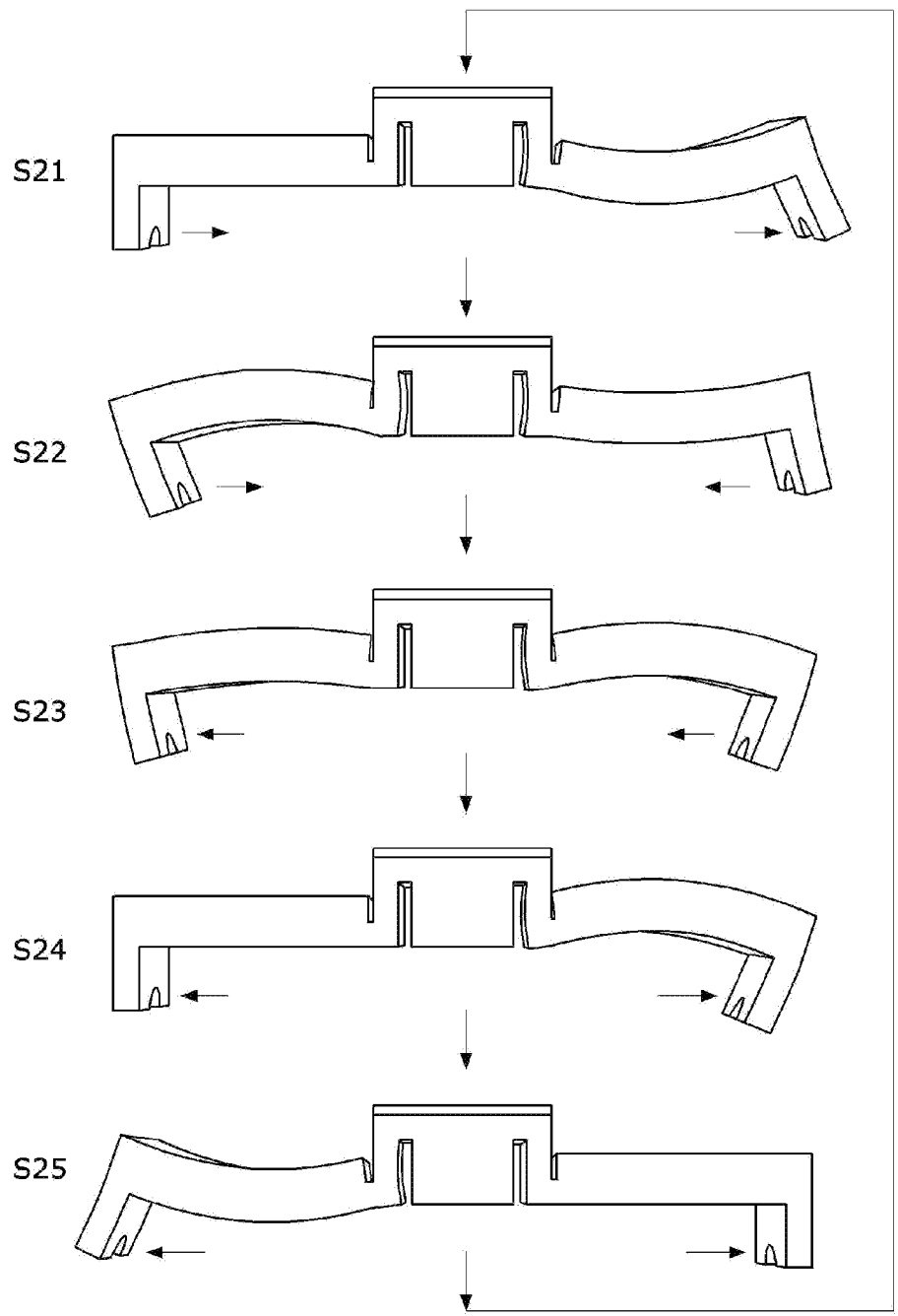

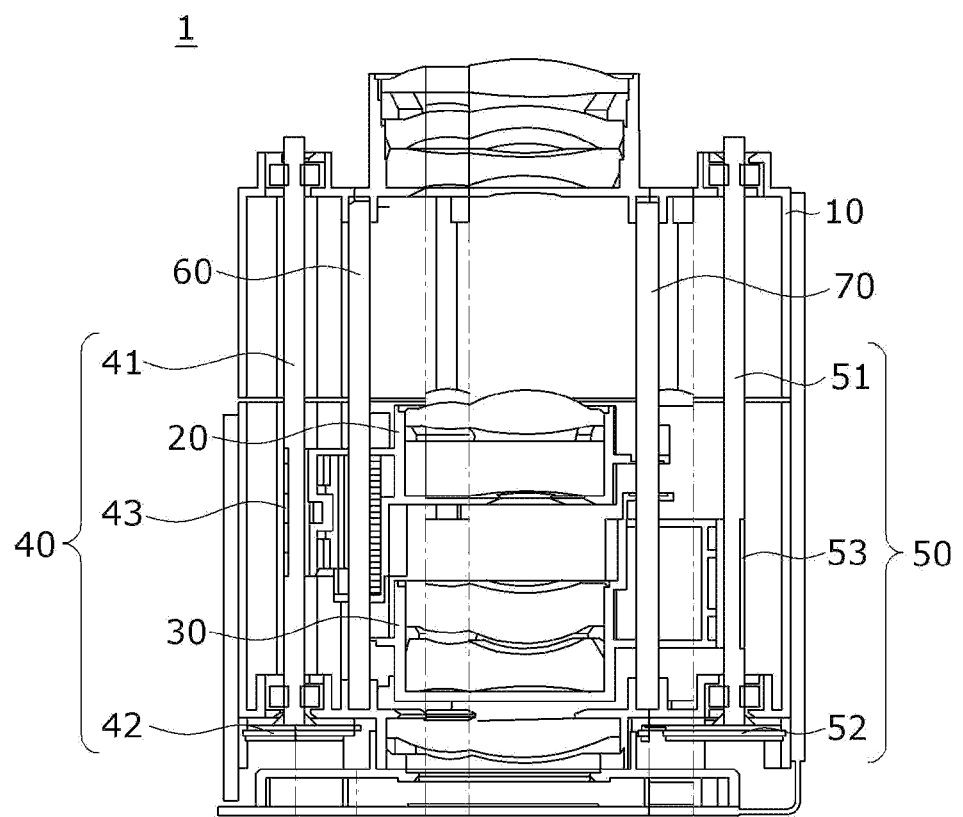
[FIG. 9]

ULTRASONIC LINEAR MOTOR AND OPERATION METHOD THEREFOR

CROSS-REFERENCE TO RELATED PATENT APPLICATIONS

This application is a U.S. National Stage Application under 35 U.S.C. § 371 of PCT Application No. PCT/KR2021/001180, filed Jan. 29, 2021, which claims priority to Korean Patent Application No. 10-2020-0073105, filed Jun. 16, 2020, whose entire disclosures are hereby incorporated by reference.

TECHNICAL FIELD

The present invention relates an ultrasonic linear motor and a method of driving the same.

BACKGROUND ART

Ultrasonic motors have various advantages that, since the ultrasonic motors generate a high torque at a relatively low speed when compared to conventional electronic motors that are widely used, a speed reducer is not required, a generated mechanical output per unit weight is high, starting and stopping is quick, and the ultrasonic motors can be compact and lightweight, and since the ultrasonic motors are independent of a magnetic field, there is no problem such as electromagnetic induction, the speed is constant when the ultrasonic motor is used, and the like. Accordingly, ultrasonic motors are being used in various fields.

Recently, as competition for camera zoom magnification of a mobile device has accelerated, research on various concepts of ultrasonic motors, such as rotational ultrasonic motors and linear ultrasonic motors, has been actively conducted to be applied to cameras.

FIG. 1 is a view for describing a method of driving an ultrasonic linear motor according to a conventional technology.

Referring to FIG. 1, in the ultrasonic linear motor according to the conventional technology, an excitation device changes a frequency of an excitation voltage so that a phase shift between a piezoelectric current and the excitation voltage reaches almost zero and electrically excites a piezoelectric actuator 2, and the piezoelectric actuator 2 linearly or rotationally moves an element 4 by driving the element 4 through frictional contact.

However, since the frequency of the excitation voltage for electrically exciting the ultrasonic actuator 2 is different from the mechanical resonant frequency of the actuator, the driving characteristics are low.

In addition, since a phase shift of zero between a piezoelectric current and an excitation voltage is an ideal condition which is not implemented in reality, driving conditions in consideration of such a phase shift need to be reflected.

RELATED ART (Patent Document 1) Registered U.S. Pat. No. 9,479,088
(Patent Document 2) Korean Registered Patent Publication No. 10-0376229

Technical Problem

The present invention is directed to providing an ultrasonic linear motor and a method of driving the same.

Technical Solution

One aspect of the present invention provides an ultrasonic linear motor including a vibrator including an elastic portion and a first piezoelectric element and a second piezoelectric element which are disposed on two surfaces of the elastic portion, a moving shaft coupled to the vibrator and moved according to a displacement of the vibrator, a mover inserted into and coupled to the moving shaft, and a controller which applies a first driving pulse and a second driving pulse to the first piezoelectric element and the second piezoelectric element, wherein a frequency of the first driving pulse and a frequency of the second driving pulse are set to a frequency between a resonant frequency at which an impedance is minimum and an anti-resonant frequency at which the impedance is maximum.

The frequency of the first driving pulse and the frequency of the second driving pulse may be set to a frequency between the resonant frequency at which the impedance is minimum and a frequency at which a phase is maximum.

A phase shift between the first driving pulse and the second driving pulse may be in the range of 0 to $\pi/18$.

A first duty cycle and a second duty cycle may be sequentially repeatedly generated for each period in each of the first driving pulse and the second driving pulse.

When the mover moves in a first direction, the first duty cycle may be smaller than the second duty cycle.

When the mover moves in a second direction, the first duty cycle may be greater than the second duty cycle.

A phase shift between the first driving pulse and the second driving pulse may be in the range of $\pi/4$ to $\pi/2$.

The first driving pulse and the second driving pulse may be generated at a constant duty cycle.

When the mover moves in a first direction, a phase of the first driving pulse may be set to be earlier than a phase of the second driving pulse.

When the mover moves in a second direction, a phase of the second driving pulse may be set to be earlier than a phase of the first driving pulse.

A frequency difference between the first driving pulse and the second driving pulse may be less than 2 kHz.

Another aspect of the present invention provides a method of driving an ultrasonic linear motor including generating a first driving pulse and a second driving pulse in order to apply the first driving pulse and the second driving pulse to a first piezoelectric element and a second piezoelectric element attached to two surfaces of an elastic portion and applying the first driving pulse and the second driving pulse to the first piezoelectric element and the second piezoelectric element, wherein a frequency of the first driving pulse and a frequency of the second driving pulse are set to a frequency between a resonant frequency at which an impedance is minimum and an anti-resonant frequency at which the impedance is maximum.

Advantageous Effects

According to embodiments, since a frequency of driving pulses applied to a motor is set in a range between a frequency at which an impedance is minimum and a frequency at which a phase is maximum, a resonant frequency range at which an efficiency is high is used, and thus, driving characteristics can be improved.

According to the embodiments, since driving signals having a phase shift predetermined according to an inertial type or frictional type are applied, a driving condition in consideration of the phase shift can be reflected.

DESCRIPTION OF DRAWINGS

FIG. 1 is a view for describing a method of driving an ultrasonic linear motor according to a conventional technology.

FIG. 2 is a view illustrating an ultrasonic linear motor according to a first embodiment of the present invention.

FIGS. 3A to 3C are views for describing driving frequencies according to an embodiment of the present invention.

FIGS. 4A and 4B are views for describing driving pulses applied to piezoelectric elements illustrated in FIG. 2.

FIG. 5 is a view for describing a driving principle of the ultrasonic linear motor according to the first embodiment.

FIG. 6 is a view illustrating an ultrasonic linear motor according to a second embodiment of the present invention.

FIGS. 7A and 7B are views for describing driving pulses applied to piezoelectric elements illustrated in FIG. 6.

FIG. 8 is a view for describing a driving principle of the ultrasonic linear motor according to the second embodiment.

FIG. 9 is a view illustrating a camera module in which an ultrasonic linear motor according to an embodiment is installed.

MODES OF THE INVENTION

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used in the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" may be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

In the embodiment, a new method, in which a frequency of driving pulses applied to a motor is in a range between a resonant frequency at which an impedance is minimum and an anti-resonant frequency at which the impedance is maximum and are set in a range between the frequency at which the impedance is minimum and a frequency at which a phase is maximum, is proposed.

In the embodiment, the frequency of the driving pulses is set to a frequency between the resonant frequency at which the impedance is minimum and the frequency at which the phase is a maximum frequency, and a phase shift is predetermined according to a driving type.

FIG. 2 is a view illustrating an ultrasonic linear motor according to a first embodiment of the present invention.

Referring to FIG. 2, the ultrasonic linear motor according to the first embodiment may be an inertial type ultrasonic motor and may include a vibrator 100 including an elastic portion 110 and piezoelectric elements 120 disposed on at least one surface of the elastic portion 110, a moving shaft 200, a mover 300, and a controller 400.

The piezoelectric elements 120 may be attached to two surfaces of the elastic portion 110. The present invention is not limited to a case in which the piezoelectric elements are attached to the two surfaces of the elastic portion 110, and the piezoelectric element may be attached to one surface of the elastic portion 110.

Aluminum (Al), brass, and stainless may be used as a material of the elastic portion 110. In this case, a concept of the stainless may include stainless steel (SS), steel type stainless (STS), and stainless use steel (SUS).

The piezoelectric elements 120 may include a first piezoelectric element 120a attached to one surface of the elastic portion 110 and a second piezoelectric element 120b attached to the other surface of the elastic portion 110. Electrodes may be sintered and formed on two surfaces of each of the piezoelectric elements 120, that is, the first piezoelectric element 120a and the second piezoelectric element 120b. In this case, the electrodes may be electrodes formed of Ag but are not limited thereto.

In this case, the elastic portion 110 and the piezoelectric elements 120 may be attached and coupled to each other using a conductive epoxy.

The moving shaft 200 may be coupled to a central portion of the vibrator 100 and linearly moved according to a displacement of the piezoelectric elements constituting the vibrator. That is, the moving shaft 200 may be attached and coupled to an upper portion of the piezoelectric element 120 constituting the vibrator 100 using an adhesive resin.

The mover 300 may be friction-fitted to the moving shaft 200 and moved on the moving shaft 200, that is, moved forward or rearward, by a frictional force generated according to linear movement of the moving shaft 200.

The controller 400 may generate driving pulses with a predetermined frequency and apply the generated driving pulses to the piezoelectric elements. For example, the controller 400 may generate a first driving pulse and a second driving pulse and apply the generated first driving pulse and second driving pulse to the first piezoelectric element and the second piezoelectric element. In this case, the frequency of the driving pulses may be set in a range between a resonant frequency at which an impedance is minimum and a frequency at which a phase is maximum.

In this case, a phase shift between the first driving pulse and the second driving pulse may be set, and in the embodiment, the phase shift between the first driving pulse and the second driving pulse may be differently set according to a driving type.

As an example, in the case of an inertial type ultrasonic linear motor, the controller 400 may apply driving pulses with a predetermined frequency and apply a first driving pulse and a second driving pulse having a phase shift in the range of 0 to $\pi/18$ to the first piezoelectric element 120a and the second piezoelectric element 120b.

In this case, the controller 400 may repeatedly generate the first driving pulse and the second driving pulse each sequentially having a first duty cycle and a second duty cycle or the second duty cycle and the first duty cycle for each period. In this case, the first duty cycle of the first driving pulse may be set to 22% to 28%, and the second duty cycle of the second driving pulse may be set to 72 to 78%, but the present invention is not necessarily limited to such numerical values and may be changed.

As another example, in the case of a fictional type ultrasonic linear motor, the controller 400 may apply driving pulses with a predetermined frequency and apply a first driving pulse and a second driving pulse having a phase shift in the range of $\pi/4$ to $\pi/2$ to the first piezoelectric element 120a and the second piezoelectric element 120b.

In this case, the controller 400 may generate the first driving pulse and the second driving pulse which have the same duty cycle. In this case, the same duty cycle of the first driving pulse and the second driving pulse may be set to 47 to 53%, but the present invention is not necessarily limited to such numerical values and may be changed.

FIGS. 3A to 3C are views for describing driving frequencies according to an embodiment of the present invention.

Referring to FIG. 3A, a frequency of a driving pulse according to the embodiment may be set in a range between a resonant frequency FR at which an impedance is minimum and an anti-resonant frequency FA at which the impedance is maximum.

Since a driving efficiency decreases when an impedance increases rapidly, in the embodiment, the frequency of the driving pulse may be set to a frequency between the resonant frequency and the anti-resonant frequency but set in a range between the resonant frequency and a frequency FP at which an impedance has a predetermined value instead of an entire range between the resonant frequency and the anti-resonant frequency.

In this case, the frequency at which the impedance has the predetermined value may be a frequency at which a phase is maximum. This is because an impedance increases rapidly at a frequency outside a range in which a phase is maximum.

For example, on the graph, since a resonant frequency is about 84.3 kHz, and a frequency at which a phase is maximum is about 87 kHz, a frequency of a driving pulse may be set in a range between about 84.3 kHz to about 87 kHz.

Referring to FIG. 3B, when a driving pulse with a frequency of 84 kHz outside the previously defined range between the resonant frequency and the frequency at which the phase is maximum is applied, a displacement of 43 mm/s occurs.

Referring to FIG. 3C, when a driving pulse with a frequency of 86 kHz in the previously defined range between the resonant frequency and the frequency at which the phase is maximum is applied, a displacement of 53 mm/s occurs.

Comparing FIGS. 3B and 3C, when the driving pulse having the frequency selected in the range between the resonant frequency and the frequency at which the phase is maximum is applied, a displacement may occur rapidly. As described above, it can be seen that the displacement occurs rapidly, and thus, driving characteristics can be improved.

FIGS. 4A and 4B are views for describing driving pulses applied to the piezoelectric elements illustrated in FIG. 2.

Referring to FIG. 4A, in the ultrasonic linear motor according to the first embodiment, when the mover moves in a first direction, a phase shift between a first driving pulse and a second driving pulse may be in the range of 0 to $\pi/18$, and a first duty cycle of, for example, 25% and a second duty cycle of, for example, 75% may be sequentially repeatedly generated for each period.

In this case, a phase of the first driving pulse may be 0 to $\pi/18$ earlier than a phase of the second driving pulse.

Referring to FIG. 4B, in the ultrasonic linear motor according to the first embodiment, when the mover moves in a second direction, a phase shift between a first driving pulse and a second driving pulse may be in the range of 0 to $\pi/18$, and a second duty cycle of 75% and a first duty cycle of 25% may be sequentially repeatedly generated for each period.

In this case, a phase of the first driving pulse may be 0 to $\pi/18$ earlier than a phase of the second driving pulse.

As illustrated in FIGS. 4A and 4B, in the inertial type ultrasonic linear motor, the same phase shift is applied, and a movement direction may be changed using a pulse width or duty cycle.

FIG. 5 is a view for describing a driving principle of the ultrasonic linear motor according to the first embodiment.

Referring to FIG. 5, in the inertial type ultrasonic linear motor according to the first embodiment, when driving pulses are applied to the piezoelectric elements, a displacement of a bending vibration waveform occurs due to contraction or expansion of the piezoelectric elements, and the elastic portion moves in a stationary waveform or linearly moves to move the moving shaft.

In the vibrator according to the first embodiment, since voltages with different phases are applied to two piezoelectric elements, the two piezoelectric elements may differently move, and thus, the vibrator may be repeatedly moved such as S11→S12→S13→S14 or S14→S13→S12→S11.

FIG. 6 is a view illustrating an ultrasonic linear motor according to a second embodiment of the present invention.

Referring to FIG. 6, the ultrasonic linear motor according to the second embodiment may be a frictional type ultrasonic motor and may include a vibrator 100-1 including an elastic portion 110-1 including one fixed part and two deforming parts and two piezoelectric ceramics 120-1 disposed on the elastic portion 110-1, a moving shaft 200-1, a mover 300-1, and a controller 400-1.

A central portion of the elastic portion 110-1 may be fixed to a housing, and end portions at two sides of the elastic portion 110-1 may be in contact with the moving shaft. The elastic portion 110-1 may be formed as two cantilevers disposed with reference to the central portion fixed to the housing.

The piezoelectric elements 120-1 may be disposed at two sides with respect to the central portion of the elastic portion 110-1 fixed to the housing and may include a first piezoelectric element 120a-1 and a second piezoelectric element 120b-1 which are disposed at the two sides. Voltages with different phases may be applied to the first piezoelectric element 120a-1 and the second piezoelectric element 120b-1. The piezoelectric elements 120-1 may be attached and coupled to the elastic portion 110-1 using an adhesion member. In this case, the adhesion member may be a conductive epoxy.

The moving shaft 200-1 may be in contact with two ends of the elastic portion to move according to deformation of the elastic portion.

The mover 300-1 may be fitted and coupled to the moving shaft 200-1 and moved along with the moving shaft 200-1.

The controller 400-1 may generate driving pulses having a predetermined frequency and apply the generated driving pulses to the piezoelectric elements 120-1. In this case, since a specific function of the controller 400-1 is the same as that of the controller 400 according to the first embodiment described with reference to FIG. 2, the description thereof will be omitted.

FIGS. 7A and 7B are views for describing driving pulses applied to the piezoelectric elements illustrated in FIG. 6.

Referring to FIG. 7A, in the ultrasonic linear motor according to the second embodiment, when the mover moves in a first direction, a first driving pulse and a second driving pulse may be generated so that a phase shift therebetween is in the range of $\pi/4$ to $\pi/2$, and a predetermined duty cycle is, for example, 50%.

In this case, a phase of the first driving pulse may be $\pi/4$ to $\pi/2$ earlier than a phase of the second driving pulse.

Referring to FIG. 7B, in the ultrasonic linear motor according to the second embodiment, when the mover moves in a second direction, a first driving pulse and a second driving pulse may be generated so that a phase shift therebetween is in the range of $\pi/4$ to $\pi/2$, and a predetermined duty cycle is, for example, 50%.

In this case, the second driving pulse may be $\pi/4$ to $\pi/2$ earlier than the first driving pulse.

As illustrated in FIGS. 7A and 7B, in the frictional type ultrasonic linear motor, the same duty cycle is applied, and a movement direction may be changed using a phase shift.

In this case, in the frictional type ultrasonic linear motor, since a resonant frequency may be slightly changed in a process of attaching the piezoelectric elements to the elastic portion, a frequency difference between the first driving pulse and the second driving pulse may be smaller than 2 kHz.

FIG. 8 is a view for describing a driving principle of the ultrasonic linear motor according to the second embodiment.

Referring to FIG. 8, in the inertial type ultrasonic linear motor according to the second embodiment, when driving pulses are applied to the piezoelectric elements, a displacement of a bending vibration waveform occurs due to contraction or expansion of the piezoelectric elements, and the two ends of the elastic portion elliptically move to move the moving shaft.

In the vibrator according to the second embodiment, since voltages with different phases are applied to two piezoelectric elements, the two piezoelectric elements may differently move, and thus, the vibrator may be repeatedly moved such as S21→S22→S23→S24→S25 or S25→S24→S23→S22→S21.

As described above, two cantilevers may differently move to move the moving shaft.

FIG. 9 is a view illustrating a camera module in which an ultrasonic linear motor according to an embodiment is installed.

Referring to FIG. 9, a camera module 1 according to the embodiment may include a housing 10, a first lens barrel 20, a second lens barrel 30, a first ultrasonic linear motor 40, a second ultrasonic linear motor 50, a first pin 60, and a second pin 70.

The housing 10 may form an exterior of the camera module 1. The housing 10 may accommodate at least one among the first lens barrel 20, the second lens barrel 30, the first ultrasonic linear motor 40, the second ultrasonic linear motor 50, the first pin 60, and the second pin 70 therein.

The first lens barrel 20 may include a plurality of lens. The first lens barrel 20 may move in an optical axis direction to perform an auto focus or a zoom function.

The second lens barrel 30 may include a plurality of lenses. The second lens barrel 30 may move in an optical direction to perform an auto focus or a zoom function.

The first ultrasonic linear motor 40 may be coupled to the first lens barrel 20. The first ultrasonic linear motor 40 may move the first lens barrel 20 in the optical axis direction. The first ultrasonic linear motor 40 may include a first vibrator 41, a first moving shaft 42, and a first mover 43.

The second ultrasonic linear motor 50 may be coupled to the second lens barrel 30. The second ultrasonic linear motor 50 may move the second lens barrel 30 in the optical axis direction. The second ultrasonic linear motor 50 may include a second vibrator 51, a second moving shaft 52, and a second mover 53.

The first pin 60 may be coupled to the first lens barrel 20 and may guide movement of the first lens barrel 20. Accordingly, an auto focus function or a zoom function may be performed.

The second pin 70 may be coupled to the second lens barrel 30 and may guide movement of the second lens barrel 30. Accordingly, an auto focus function or a zoom function may be performed.

Terms such as "~unit" used in the present embodiment refer to software or a hardware component such as a field-programmable gate array (FPGA) or an application-specific integrated circuit (ASIC), and objects termed "unit" perform certain roles. However, the term "~unit" is not limited to software or hardware. A "~unit" may reside on an addressable storage medium or to operate one or more processors. Thus, in an example, the term "~unit" includes components such as software components, object-oriented software components, class components, task components, processes, functions, properties, procedures, subroutines, segments of program code, drivers, firmware, micro-code, circuits, data, data bases, data structures, tables, arrays, and variables. Functions provided by these components and "~units" may be combined into a smaller number of components and "~units" or may be subdivided into additional components and "~units." Furthermore, the components and "~units" may also be implemented to operate one or more central processing units (CPUs) within a device or a security multimedia card.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS 100, 100-1: VIBRATOR
110, 110-1: ELASTIC PORTION
120, 120-1: PIEZOELECTRIC ELEMENT 200, 200-1: MOVING SHAFT
300, 300-1: MOVER
400, 400-1: CONTROLLER

The invention claimed is:

1. An ultrasonic linear motor comprising:
   a vibrator including
      an elastic portion, and
      a first piezoelectric element and a second piezoelectric element which are disposed on two surfaces of the elastic portion;
   a moving shaft coupled to the vibrator and moved according to a displacement of the vibrator;
   a mover inserted into and coupled to the moving shaft; and
   a controller which applies a first driving pulse and a second driving pulse to the first piezoelectric element and the second piezoelectric element,
   wherein a frequency of the first driving pulse and a frequency of the second driving pulse are set in a range between the resonant frequency at which the impedance is minimum and a frequency at which a phase is maximum, among an entire range between a resonant frequency at which an impedance is minimum and an anti-resonant frequency at which the impedance is maximum.

2. The ultrasonic linear motor of claim 1, wherein a phase shift between the first driving pulse and the second driving pulse is in the range of 0 to $\pi/18$.

3. The ultrasonic linear motor of claim 2, wherein a first duty cycle and a second duty cycle are sequentially repeatedly generated for each period in each of the first driving pulse and the second driving pulse.

4. The ultrasonic linear motor of claim 3, wherein, when the mover moves in a first direction, the first duty cycle is smaller than the second duty cycle.

5. The ultrasonic linear motor of claim 3, wherein, when the mover moves in a second direction, the first duty cycle is greater than the second duty cycle.

6. The ultrasonic linear motor of claim 1, wherein a phase shift between the first driving pulse and the second driving pulse is in the range of $\pi/4$ to $\pi/2$.

7. The ultrasonic linear motor of claim 6, wherein the first driving pulse and the second driving pulse are generated at a constant duty cycle.

8. The ultrasonic linear motor of claim 6, wherein, when the mover moves in a first direction, a phase of the first driving pulse is set to be earlier than a phase of the second driving pulse.

9. The ultrasonic linear motor of claim 6, wherein, when the mover moves in a second direction, a phase of the second driving pulse is set to be earlier than a phase of the first driving pulse.

10. The ultrasonic linear motor of claim 6, wherein a frequency difference between the first driving pulse and the second driving pulse is less than 2 kHz.

11. A camera module comprising:
    a housing;
    a lens barrel disposed in the housing; and
    the ultrasonic linear motor of claim 1 which is coupled to the lens barrel and moves the lens barrel in an optical axis direction.

* * * * *